(12) United States Patent
Harada

(10) Patent No.: US 8,011,906 B2
(45) Date of Patent: Sep. 6, 2011

(54) PISTON PUMP

(75) Inventor: Tomoo Harada, Anjo (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 707 days.

(21) Appl. No.: 12/027,780

(22) Filed: Feb. 7, 2008

(65) Prior Publication Data
US 2008/0206081 A1 Aug. 28, 2008

(30) Foreign Application Priority Data

Feb. 27, 2007 (JP) ................. 2007-047356

(51) Int. Cl.
F04B 39/10 (2006.01)
F04B 53/12 (2006.01)

(52) U.S. Cl. .......................... 417/546; 417/254; 417/552

(58) Field of Classification Search .................. 417/254, 417/270, 546, 549, 552
See application file for complete search history.

(56) References Cited

U.S. PATENT DOCUMENTS

| | | | |
|---|---|---|---|
| 5,577,896 A * | 11/1996 | Harada | 417/259 |
| 7,690,899 B2 * | 4/2010 | Harada | 417/254 |
| 7,785,085 B2 * | 8/2010 | Maeda et al. | 417/554 |

FOREIGN PATENT DOCUMENTS

| | | |
|---|---|---|
| JP | 7-035035 A | 2/1995 |
| JP | 7-279834 A | 10/1995 |

* cited by examiner

Primary Examiner — Devon C Kramer
Assistant Examiner — Peter J Bertheaud
(74) Attorney, Agent, or Firm — Buchanan Ingersoll & Rooney PC

(57) ABSTRACT

A piston pump includes a pump mechanism for changing a volume of a pump chamber to move a piston in a housing, and a feed mechanism that has a feed ring attached to a circular groove portion of the piston to be slaved with a movement of the piston. The feed mechanism is located in a suction passage from a suction port to a pump chamber, and the piston has a flange portion protruding radially outwardly. An inner peripheral surface of the feed ring has an inner-diameter enlarged portion extending radially outwardly to have an enlarged passage portion between the inner peripheral surface of the feed ring and the outer peripheral surface of the piston, and a valve portion for opening and closing a suction passage is constructed of an end portion of the inner diameter enlarged portion of the feed ring and the flange portion.

3 Claims, 7 Drawing Sheets

PISTON PUMP

CROSS REFERENCE TO RELATED APPLICATION

This application is based on Japanese Patent Application No. 2007-047356 filed on Feb. 27, 2007, the contents of which are incorporated herein by reference in its entirety.

BACKGROUND OF THE INVENTION

1. Field of the Invention

The present invention relates to a piston pump having a feed mechanism.

2. Description of the Related Art

A brake fluid pressure controller for a vehicle is provided with an electronic control function such an electronic stability control function. A conventional piston pump used for the brake fluid pressure controller has itself a function for pressure-feeding a fluid to be drawn, into a pump chamber (e.g., JP Patent No. 3097726 B2 and JP Patent No. 3278982 B2, which correspond to U.S. Pat. No. 5,577,896).

In the piston pump, a circular groove portion is provided on an outer periphery surface of a piston, and a feed ring is attached to the circular groove portion so as to form a feed chamber between the feed ring and a housing. Furthermore, a valve portion is formed between the piston and the feed ring such that the feed ring abuts on or separates from the circular groove portion, thereby opening and closing an inlet passage of the feed chamber. When the piston is in a suction stroke, the valve portion is closed so as to pressure-feed the fluid in the feed chamber to a pump chamber.

In the piston pump described in JP Patent No. 3278982 B2, during a compression stroke of the piston, the fluid (liquid) having passed through the valve portion passes through a narrow clearance between the circular groove portion and feed ring and a passage inside the piston, and is drawn into the feed chamber. In contrast, in the piston pump described in JP Patent No. 3097726 B2, during a compression stroke of the piston, the fluid (liquid) having passed through the valve portion is drawn into the feed chamber through a slit passage that is provided on an end surface of the feed ring.

However, in the piston pump described in JP Patent No. 3278982 B2, a portion around the valve portion is throttled to have a smallest passage sectional area in a suction passage from a suction port to the feed chamber. When the temperature of the fluid such as a brake liquid (working oil) to be drawn into the pump chamber is low, the viscosity of the fluid becomes higher. In this case, the fluid feeding performance to the feed chamber through the smallest passage sectional area becomes deteriorated, and responding performance to a pressure increase is restricted.

In the piston pump described in JP Patent No. 3097726 B2, when the temperature of the fluid such as brake liquid (working oil) to be drawn into the pump chamber is low, the fluid feeding performance to the feed chamber through the slit passage on the end surface of the feed ring becomes deteriorated, and responding performance to a pressure increase is also restricted.

SUMMARY OF THE INVENTION

In view of the foregoing problems, it is an object of the present invention to provide a piston pump having a feed mechanism for feeding a fluid to be drawn into a feed chamber, which effectively improves a responding performance to a pressure increase even when a viscosity of the fluid to be drawn becomes higher.

It is another object of the present invention to provide a piston pump having a feed mechanism, which can effectively draw and feed a fluid into a feed chamber.

According to an aspect of the present invention, a piston pump includes a housing having a pump chamber for compressing a fluid, a piston located in the housing to reciprocate in an axial direction and having a circular groove portion on its outer periphery, a pump mechanism and a feed mechanism. The pump mechanism changes a volume of the pump chamber to move the piston such that the fluid drawn from a suction port is compressed in the pump chamber and is discharged from a discharge port. The feed mechanism has a feed ring attached to the circular groove portion of the piston to be slaved with a movement of the piston, a feed chamber defined between the feed ring and the housing, and a valve portion for opening and closing an inlet passage of the feed chamber by contacting the piston to the feed ring and separating the piston from the feed ring. In the piston pump, the feed mechanism is located in a suction passage from the suction port to the pump chamber, the feed ring has an inner peripheral surface that is spaced from an outer peripheral surface of the piston at the groove portion to form a part of the suction passage, and the valve portion is closed in a suction stroke to reduce a volume of the feed chamber so as to pressure-feed the fluid in the feed chamber to the pump chamber. In addition, the piston has a flange portion protruding radially outwardly, the inner peripheral surface of the feed ring has an inner-diameter enlarged portion extending radially outwardly to have an enlarged passage portion between the inner peripheral surface of the feed ring and the outer peripheral surface of the piston, and the valve portion is constructed of an end portion of the inner diameter enlarged portion of the feed ring and the flange portion.

Because the enlarged passage portion is formed between the inner peripheral surface of the feed ring and the outer peripheral surface of the piston, a liquid fluid can be smoothly pressure-fed to the feed chamber even when the viscosity of the fluid is increased at a low temperature. Furthermore, because the flange portion can be used as a seat surface of the valve portion, the valve portion can accurately open and close the inlet passage of the feed chamber even when the enlarged passage portion is formed between the inner peripheral surface of the feed ring and the outer peripheral surface of the piston. Accordingly, when the piston pump is used for a brake fluid pressure controller for a vehicle, a responding performance to a pressure increase can be effectively improved.

For example, the enlarged passage portion between the inner peripheral surface of the feed ring and the outer peripheral surface of the piston may be a taper hole gradually enlarged in a radial dimension toward the flange portion.

Alternatively, the suction passage may have first and second paths extending from a position of the valve portion to the feed chamber. In this case, the first path may be a passage passing through an interior of the piston, and the second path may be located between the piston and the feed ring in parallel with the first path relative to a flow of the fluid. As an example, a slit may be provided in the feed ring to form the second path.

BRIEF DESCRIPTION OF THE DRAWINGS

Additional objects and advantages of the present invention will be more readily apparent from the following detailed description of preferred embodiments when taken together with the accompanying drawings. In which.

DETAILED DESCRIPTION OF THE PREFERRED EMBODIMENTS

First Embodiment

A first embodiment of the present invention will be now described with reference to FIGS. 1 to 4. In the first embodiment, a piston pump can be suitably used as a liquid fluid pressure source for a brake fluid pressure controller for a vehicle, for example.

Figure 1:
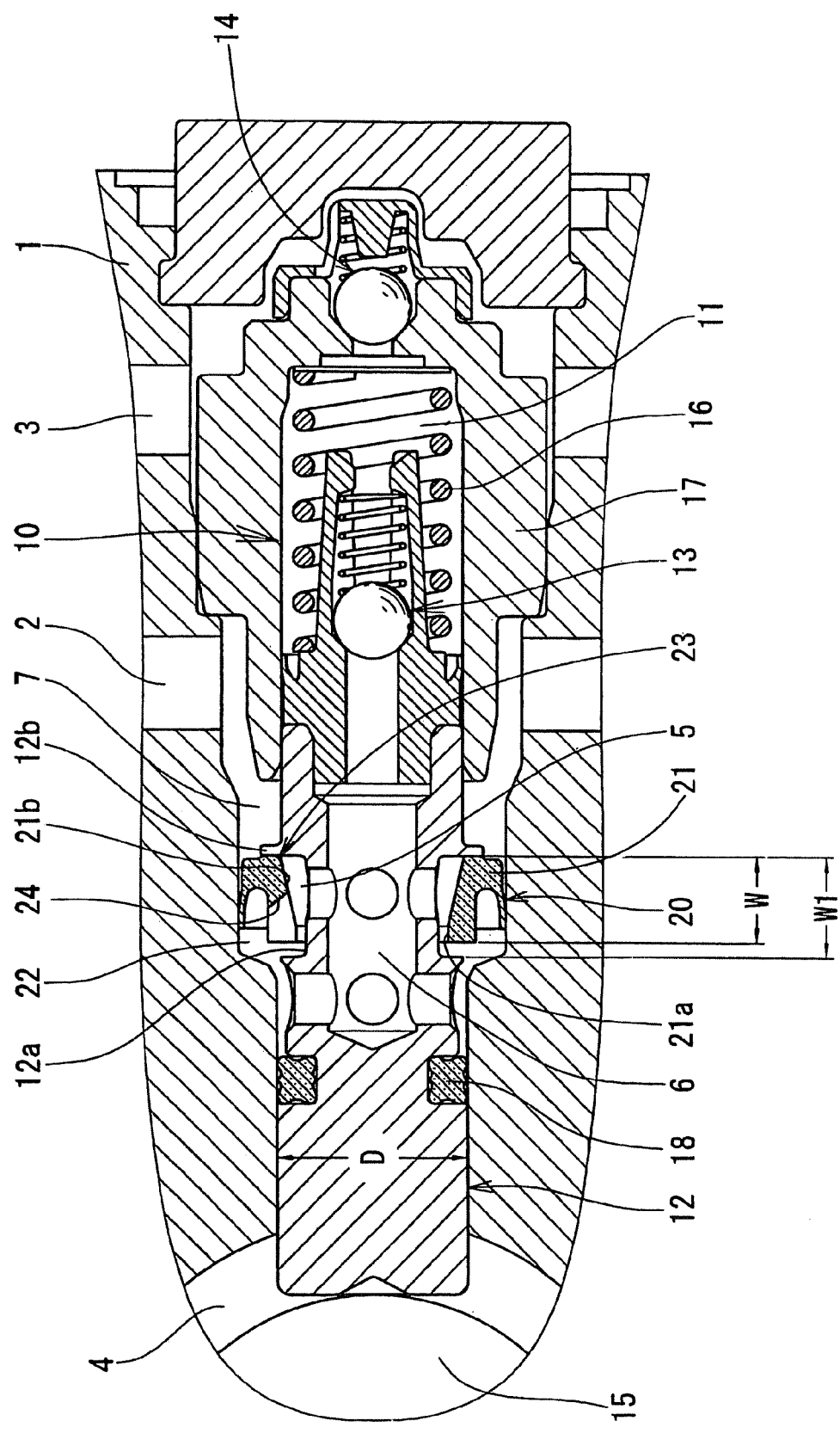
FIG. 1 is a cross sectional view showing a part of a piston pump according to a first embodiment of the present invention.
Figure 2:
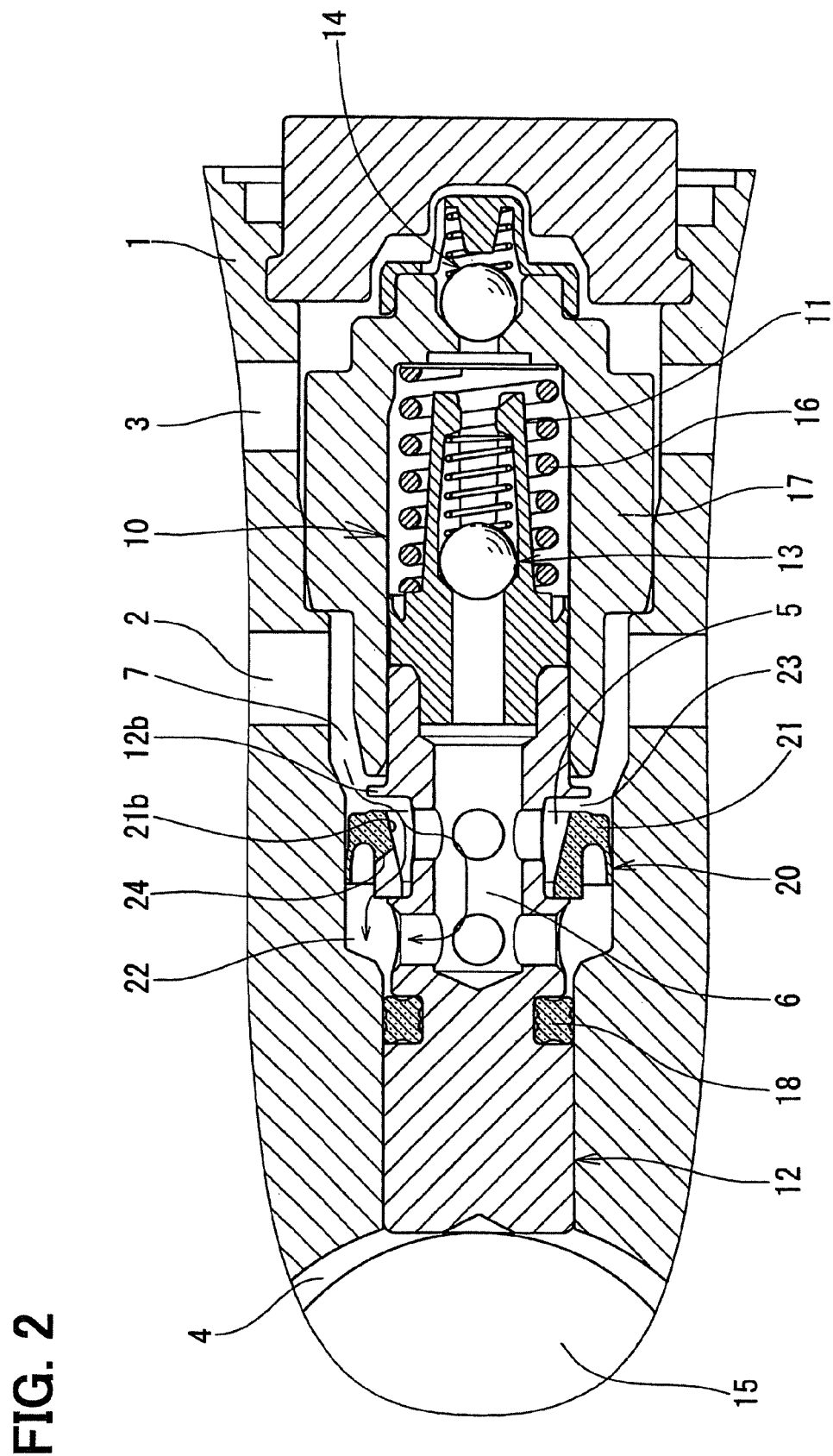
FIG. 2 is a cross sectional view showing a moved state of a piston from a bottom dead point to a top dead point in the piston pump according to the first embodiment.

As shown in FIGS. 1 and 2, the piston pump includes a housing 1, a pump mechanism 10 and a feed mechanism 20. The pump mechanism 10 and the feed mechanism 20 are disposed inside the housing 1. The housing 1 has a suction port 2 and a discharge port 3 which are provided to communicate with a pump chamber 11. The suction port 2 is provided for drawing the fluid into the pump chamber 11, the pump chamber 11 is provided for compressing the drawn fluid, and the discharge port 3 is provided for discharging the compressed fluid.

The pump mechanism 10 includes the pump chamber 11 that is provided within the housing 1, a piston 12, a suction valve 13, a discharge valve 14, an eccentric cam 15, and a return spring 16 of the piston 12. The piston 12 is attached into the housing 1 to be slidable in an axial direction, the suction valve 13 is located at an inlet portion of the pump chamber 11, the discharge valve 14 is located at an outlet portion of the pump chamber 11, and the eccentric cam 15 is located to drive the piston 12.

The pump chamber 11 is formed and defined in a cylinder member 17 that is disposed within the housing 1, and the eccentric cam 15 is located in an air chamber 4 provided in the housing 1. The piston 12 has one end portion in the axial direction that is liquid-tightly inserted into the cylinder member 17, and the other end portion in the axial direction. The other end portion of the piston 12 in the axial direction is disposed directly in the housing 1. A clearance between the housing 1 and an outer periphery of the other end portion of the piston 12 can be liquid-tightly sealed by using a seal member 18. The one end portion of the piston 12 may be made of a resin material having elasticity. In this case, the one end portion of the piston 12 can be liquid-tightly inserted into the cylinder member 17 without using a seal member.

The eccentric cam 15 is attached to a drive shaft (not shown) to push and move the piston 12 to the side of the pump chamber 11. Furthermore, the piston 12 moved to the side of the pump chamber 11 is returned by the return spring 16, so that the piston 12 reciprocates in the axial direction. The volume of the pump chamber 11 is increased and decreased in accordance with the reciprocation movement of the piston 12, thereby drawing and discharging a fluid (e.g., liquid fluid) in the pump chamber 11.

The outer periphery of the piston 12 is provided with a circular groove portion 12a, and a flange portion 12b protruding radially outerwardly. The suction valve 13 and the discharge valve 14 have a valve structure that is generally known.

The feed mechanism 20 is disposed within the housing 1 in a suction passage 7 that is provided to extend from the suction port 2 to the pump chamber 11. The suction passage 7 is provided for feeding the fluid drawn from the suction port 2 to the pump chamber 11. The feed mechanism 20 includes a feed ring 21, a feed chamber 22 formed between the feed ring 21 and the housing 1, and a valve portion 23 (valve means) located to open and close an inlet passage of the feed chamber 22. The feed ring 21 is attached to the circular groove portion 12a of the piston 12 to be slave-operated in accordance with the movement of the piston 12.

Figure 3:
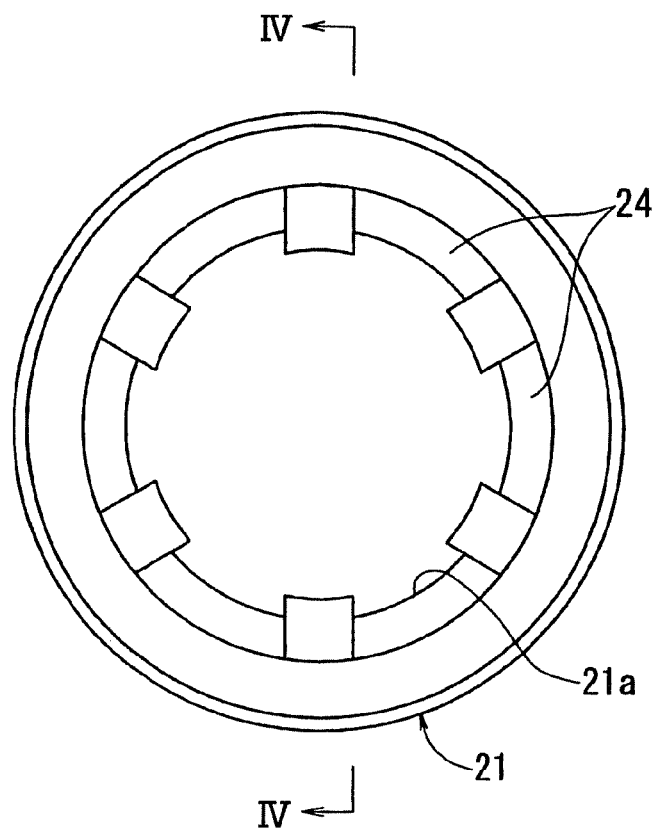
FIG. 3 is a top view showing a feed ring of the piston pump according to the first embodiment.
Figure 4:
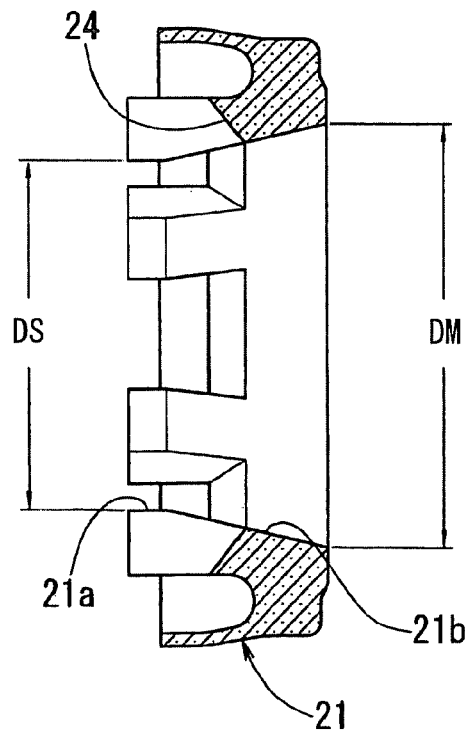
FIG. 4 is a cross-sectional view taken along the line IV-IV in FIG. 3.

The feed ring 21 is a cup-shaped seal member made of a rubber material having an oil resistance property or a soft resin material having an oil resistance property. As shown in FIGS. 3 and 4, the feed ring 21 has an inside hole portion 21a at a radial inside area, and an inner-diameter enlarged portion 21b enlarged partially in a tapered hole shape. The inner-diameter enlarged portion 21b defines a taper hole portion in which its diameter is gradually enlarged toward the flange portion 12b. Therefore, as shown in FIG. 4, the hole diameter DM at the end (right end in FIG. 4) of the feed ring 21 on the side of the flange portion 12b becomes larger due to the tapered shape of the inner-diameter enlarged portion 21b.

The inner diameter DS of the inside hole portion 21a of the feed ring 21 at the end portion (left end portion in FIG. 4) on the side of the feed chamber 22 is set larger than the radial diameter of a groove bottom portion of the circular groove portion 12a and smaller than the outer diameter D of the piston 12, as shown in FIG. 1. Furthermore, an axial dimension W of the feed ring 21 in the axial direction of the piston 12 is made smaller than a groove width dimension W1 of the circular groove portion 12a. Accordingly, a slaved operation amount of the feed ring 21 relative to the movement of the piston 12 becomes smaller by a dimension difference between the dimension W1 and the dimension W. In the piston pump having the above structure, the relative movement in the axial direction is caused between the piston 12 and the feed ring 21, so as to open and close the valve portion 23.

The end surface of the flange portion 12b can be used as a seat surface in the valve portion 23, such that the feed ring 21 can abut onto or separate from the end surface of the flange portion 12b on the side opposite to the feed chamber 22. By contacting the piston 12 to the feed ring 21 and separating the piston 12 from the feed ring 21, a passage formed between the flange portion 12b and the feed ring 21 can be opened and closed. That is, when the feed ring 21 abuts on the end surface of the flange portion 12b on the side opposite to the feed chamber 22, the passage formed between the flange portion 12b and the feed ring 21 is closed. When the feed ring 21 separates from the end surface of the flange portion 12b on the side opposite to the feed chamber 22, the passage formed between the flange portion 12b and the feed ring 21 is opened.

In the first embodiment, a passage 5 (space) is formed between the inner-diameter enlarged portion 21b of the feed ring 21 and the groove bottom surface of the circular groove portion 12a in a radial direction of the piston 12. Here, the groove bottom surface of the circular groove portion 12a corresponds to a part of the radial outer peripheral surface of the piston 12. The feed ring 21 and the circular groove portion 12a are formed such that the passage 5 is used as a part of the suction passage 7 between the valve portion 23 and the feed chamber 22. Because the inner-diameter enlarged portion 21b is provided in the feed ring 21, the passage sectional area of the passage 5 is enlarged.

Furthermore, the flange portion 12b is provided to protrude radially outside. Therefore, even if the passage 5 having the enlarged passage sectional area is formed, because the end surface of the flange portion 12b is used as a seal surface of the valve portion 23, the valve portion 23 can be operated to be accurately and safely opened and closed. That is, by providing the flange portion 12b, a center area of the feed ring 21 between a radial interior and a radial exterior is pushed onto the flange portion 12b when the valve portion 23 is closed, thereby improving the performance of the valve portion 23.

The interior of the piston 12 has a passage 6 that is provided to communicate with the passage 5. In the suction passage 7, a passage to the feed chamber 22 via the passages 5 and 6 can be used as a first path of a suction passage portion from the passage 5 to the feed chamber 22.

As shown in FIG. 3, plural slits 24 are formed in the feed ring 21 in a circumferential direction of the feed ring 21 to be separated from each other in the circumferential direction. The slits 24 are formed such that the passage 5 between the piston 12 and the feed ring 21 communicates with the feed chamber 22 via the slits 24. Therefore, the slits 24 are used as a second path of the suction passage portion from the passage 5 to the feed chamber 22 in the suction passage 7.

According to the first embodiment of the present invention, the passage sectional area of the passage 5 is radially enlarged by using the inner-diameter enlarged portion 21b of the feed ring 21, and the suction passage portion in the suction passage 7 from the passage 5 to the feed chamber 22 is formed by using both the first path and the second path. In addition, the first path and the second path are arranged in parallel in a flow of the fluid. Therefore, the suction resistance of the fluid flowing to the feed chamber 22 can be effectively reduced.

The second path of the suction passage 7 can be formed by using the slits 24 provided on the piston 12. The slits 24 can be easily formed in the feed ring 21 by molding, thereby reducing the product cost.

Next, the operation of the piston pump according to the first embodiment will be now described. When the piston 12 is moved from the bottom dead point shown in FIG. 1 to a compression stroke for compressing the liquid fluid in the pump chamber 11, the valve portion 23 is opened as shown in FIG. 2, so that the liquid fluid having passed through the valve portion 23 is drawn into the feed chamber 22 via the first path and the second path of the suction passage 7. At this time, the suction valve 13 is closed and the discharge valve 14 is opened in the compression stroke.

In contrast, when the piston 12 is moved from the top dead point shown in FIG. 2 to a suction stroke for drawing the liquid fluid into the pump chamber 11, the valve portion 23 is closed as shown in FIG. 1, so that the liquid fluid in the feed chamber 22 is pressed and pushed by the feed ring 21 to be pressure-fed to the pump chamber 11. Thus, even when the viscosity of the liquid fluid becomes higher, the liquid fluid can be smoothly drawn into the feed chamber 22 and the pump chamber 11, so as to improve responsibility to a fluid pressure increase in the pump portion even at a low temperature.

When the difference between the groove width dimension W1 of the circular groove portion 12a and the axial dimension of the feed ring 21 becomes larger, the passage around the valve portion 23 becomes larger. However, in this case, the slaved operation amount of the feed ring 21 relative to the piston 12 becomes smaller, thereby reducing a compression ratio and a compression efficiency, due to the feed ring 22. In the first embodiment, because the passage sectional area of the passage 5 is enlarged due to the inner-diameter enlarged portion 21b of the feed ring 21, it is unnecessary to increase the difference between the groove width dimension W1 of the circular groove portion 12a and the axial dimension of the feed ring 21. Therefore, the pressure-feeding efficiency of the liquid fluid to the feed chamber 22 can be effectively improved.

Figure 7:
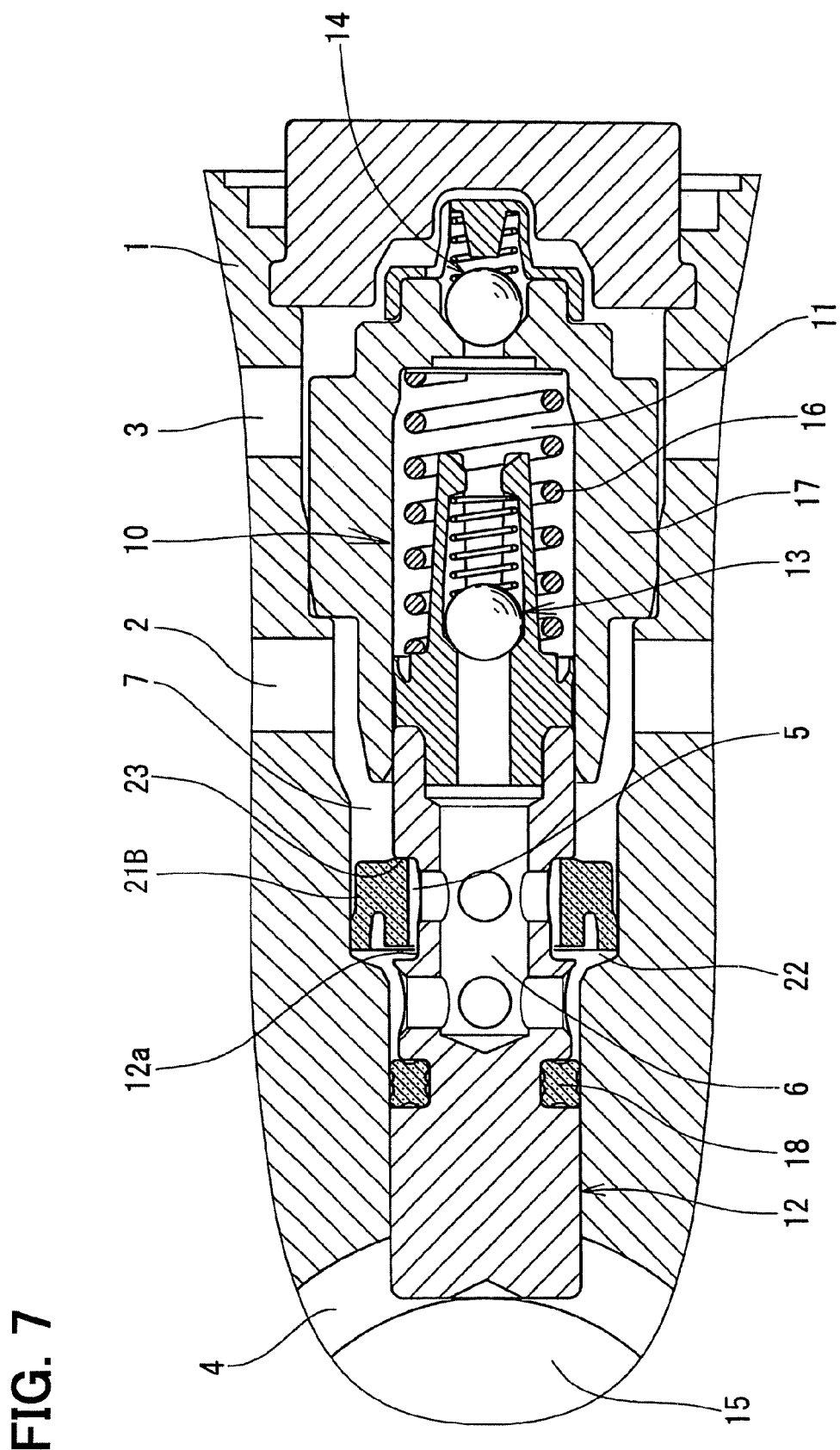
FIG. 7 is a cross sectional view showing a part of a piston pump according to a comparative example.
Figure 8:
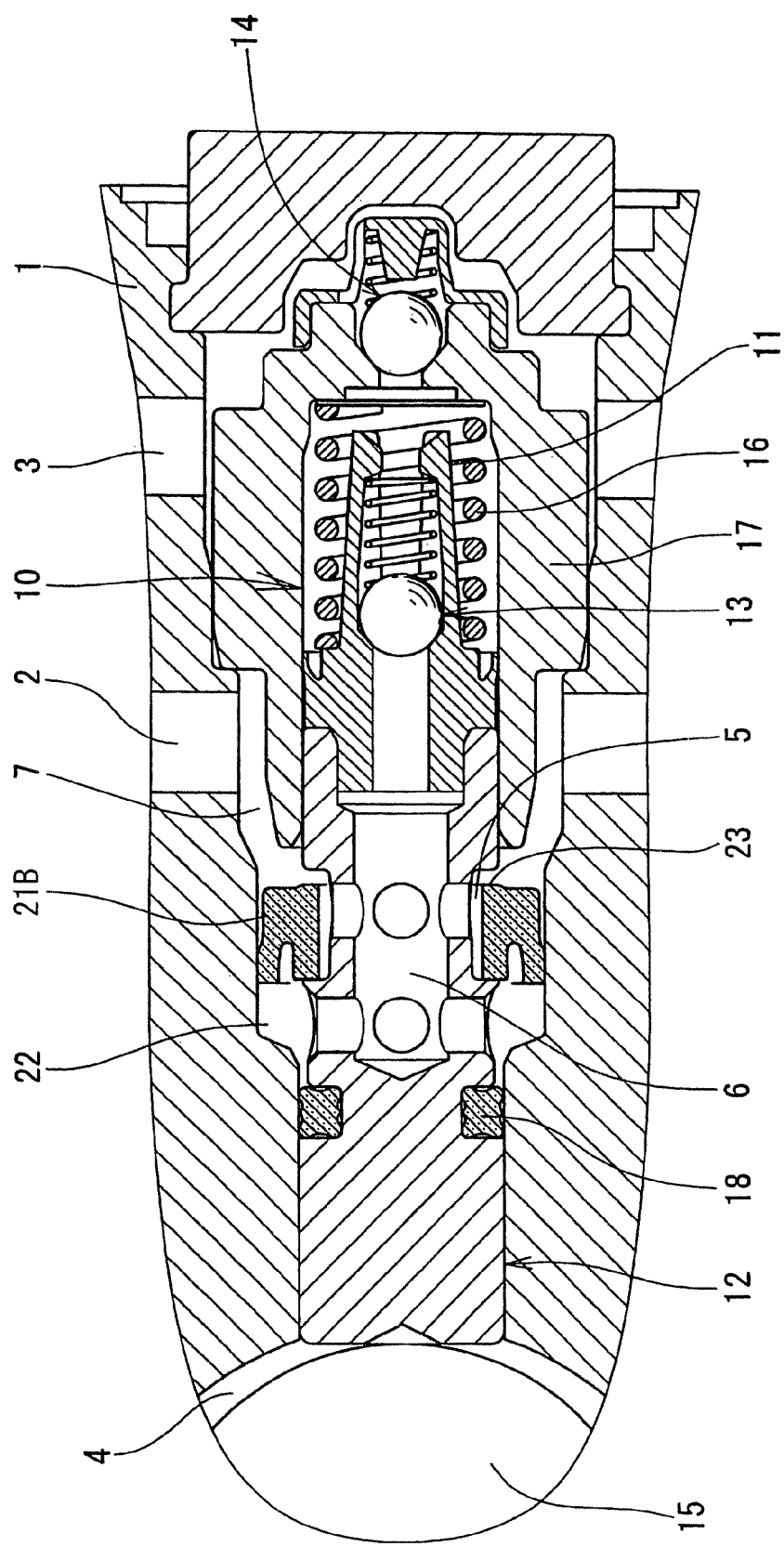
FIG. 8 is a cross sectional view showing a moved state of a piston from a bottom dead point to a top dead point in the piston pump of FIG. 7.

FIGS. 7 and 8 show a piston pump of a comparative example, in which no flange portion is provided in the piston 12 and a feed ring 21B not provided with an inner-diameter enlarged portion is provided. In this case, the passage sectional area of the passage 5 is substantially not enlarged. In the piston pump of the comparative example, the other parts are similar to those of the above-described first embodiment. In FIGS. 7 and 8, identical reference numbers are indicated in the parts having functions similar to those of the above first embodiment shown in FIGS. 1 and 2.

Some tests regarding a pressure increase time in the piston pump of the first embodiment and the piston pump of the comparative example were performed by the inventor of the present application, in conditions where a brake fluid for a vehicle is used as the liquid fluid. At a normal temperature, the pressure increase time is not different between the piston pump of the first embodiment and the piston pump of the comparative example. However, in a low temperature range between −20° C. and −30° C., the pressure increase time of the piston pump of the first embodiment becomes faster about by 10-15% than that of the piston pump of the comparative example.

In the above-described first embodiment of the present invention, because the inner-diameter enlarged portion 21b is provided in the feed ring 21 and the flange portion 12b is provided on the outer periphery of the piston 12, the pressure increasing time can be effectively reduced in the piston pump.

Second Embodiment

Figure 5:
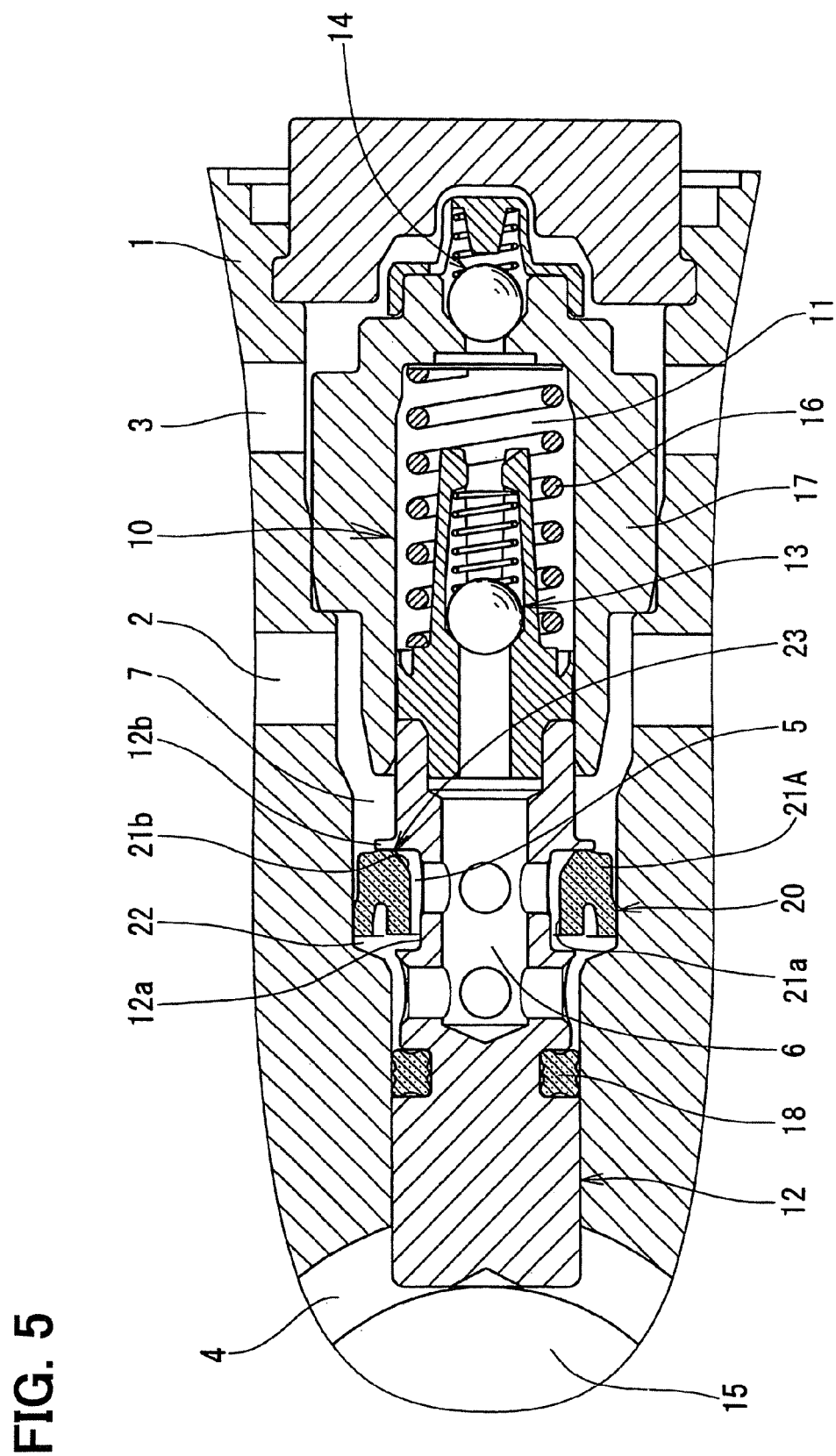
FIG. 5 is a cross sectional view showing a part of a piston pump according to a second embodiment of the present invention.
Figure 6:
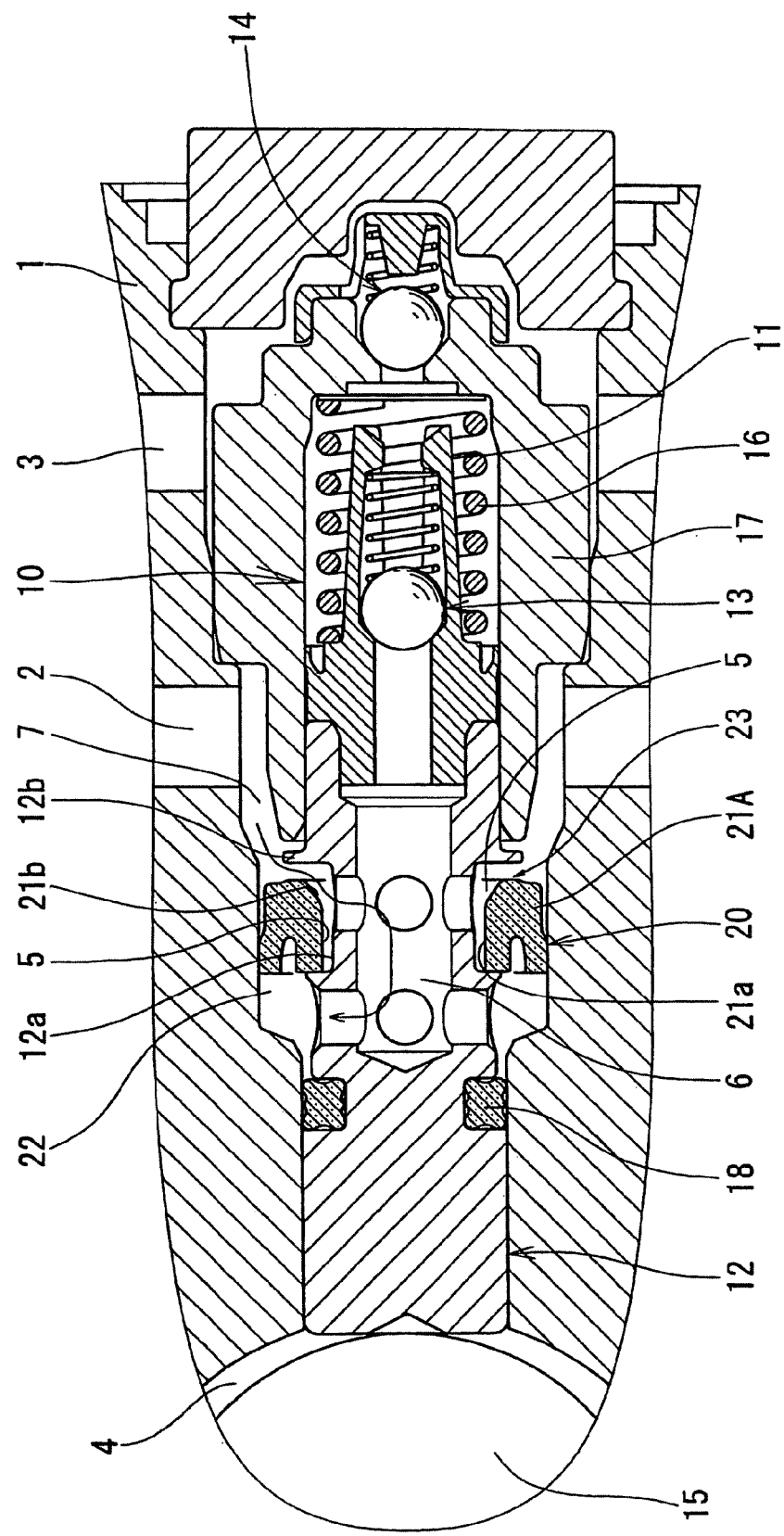
FIG. 6 is a cross sectional view showing a moved state of a piston from a bottom dead point to a top dead point in the piston pump according to the second embodiment.

A second embodiment of the present invention will be described with reference to FIGS. 5 and 6. In a piston pump of the second embodiment, a feed ring 21A without having a slit is used instead of the feed ring 21 of the first embodiment. In the second embodiment, the other parts of the piston pump are similar to those of the above-described first embodiment, and the detail description thereof is omitted. In FIGS. 5 and 6, identical reference numbers are indicated in the parts having functions similar to those of the above first embodiment shown in FIGS. 1 and 2.

In the second embodiment, because no slit is provided in the feed ring 21, the suction passage portion from the passage 5 to the feed chamber 22 is formed only via the first path by using the passage 6 inside the piston 12. That is, in the second embodiment, the second path from the passage 5 to the feed chamber 22 is not provided in the suction passage 7. Accordingly, in the second embodiment, the inner-diameter enlarged portion 21b can be formed in the feed ring 21A in a narrow area, as compared with the first embodiment.

In the second embodiment, because the inner-diameter enlarged portion 21b is provided in the feed ring 21A and the flange portion 12b is provided on the outer periphery of the piston 12, the pressure increasing time can be effectively reduced in the piston pump, through not to the extent of the first embodiment.

Other Embodiments

Although the present invention has been fully described in connection with the preferred embodiments thereof with reference to the accompanying drawings, it is to be noted that various changes and modifications will become apparent to those skilled in the art.

For example, in the above-described embodiments, the piston pump can be suitably used as a fluid pressure source for a brake fluid pressure controller for a vehicle, or can be used for the other field or device.

In the piston pump of the above-described embodiments, when the inner peripheral surface of the feed ring 21, 21A has the inner-diameter enlarged portion 21*b* extending radially outwardly to have an enlarged passage portion between the inner peripheral surface of the feed ring 21, 21A and the outer peripheral surface of the piston 12, and when the valve portion 23 is constructed of an end portion of the inner diameter enlarged portion 21*b* and the flange portion 12*b* of the piston 12, the other structures may be suitably changed.

Such changes and modifications are to be understood as being within the scope of the present invention as defined by the appended claims.

What is claimed is:

1. A piston pump comprising:
a housing having a pump chamber for compressing a fluid, a suction port from which the fluid is drawn, and a discharge port for discharging the compressed fluid;
a piston located in the housing to reciprocate in an axial direction, the piston having a circular groove portion on its outer periphery;
a pump mechanism for changing a volume of the pump chamber to move the piston such that the fluid drawn from the suction port is compressed in the pump chamber and is discharged from the discharge port; and
a feed mechanism that has a feed ring attached to the circular groove portion of the piston to be slaved with a movement of the piston, a feed chamber defined between the feed ring and the housing, and a valve portion for opening and closing an inlet passage of the feed chamber by contacting the piston to the feed ring and separating the piston from the feed ring, wherein:
the feed mechanism is located in a suction passage from the suction port to the pump chamber;
the feed ring has an inner peripheral surface that is spaced from an outer peripheral surface of the piston at the groove portion to form a part of the suction passage;
the valve portion is closed in a suction stroke to reduce a volume of the feed chamber so as to pressure-feed the fluid in the feed chamber to the pump chamber;
the piston has a flange portion protruding radially outwardly;
the inner peripheral surface of the feed ring has an inner-diameter enlarged portion extending radially outwardly to have an enlarged passage portion between the inner peripheral surface of the feed ring and the outer peripheral surface of the piston;
the valve portion is constructed of an end portion of the inner diameter enlarged portion of the feed ring and the flange portion;
wherein the suction passage has first and second paths from a position of the valve portion to the feed chamber;
the first path is a passage passing through an interior of the piston; and
the second path is located between the piston and the feed ring in parallel with the first path relative to a flow of the fluid.

2. The piston pump according to claim 1, wherein the enlarged passage portion between the inner peripheral surface of the feed ring and the outer peripheral surface of the piston is a tapered hole enlarged in a radial dimension toward the flange portion.

3. The piston pump according to claim 1, wherein:
the feed ring has a slit at a position adjacent to the piston; and
the slit is provided to form the second path.

* * * * *